United States Patent [19]

Kiuchi

[11] Patent Number: 4,676,478

[45] Date of Patent: Jun. 30, 1987

[54] ELECTROMAGNETICALLY-OPERATED FUEL INJECTION VALVE

[75] Inventor: Hideo Kiuchi, Aichi, Japan

[73] Assignee: Nippondenso Co., Ltd., Kariya, Japan

[21] Appl. No.: 799,251

[22] Filed: Nov. 18, 1985

[30] Foreign Application Priority Data

Dec. 26, 1984 [JP] Japan ............................... 59-276901

[51] Int. Cl.[4] ............................................. F16K 31/06

[52] U.S. Cl. ........................... 251/129.08; 251/129.15; 251/129.21; 123/472; 335/227; 239/585

[58] Field of Search ....................... 251/129.15, 129.21, 251/129.08; 123/472; 335/227; 239/585

[56] References Cited

U.S. PATENT DOCUMENTS

| | | | |
|---|---|---|---|
| 2,853,659 | 9/1958 | Herion | 251/129.15 X |
| 3,071,714 | 1/1963 | Hadekel | 335/227 |
| 3,820,757 | 6/1974 | Siebel | 251/129.21 |
| 4,331,317 | 5/1982 | Kamai et al. . | |
| 4,419,642 | 12/1983 | Kramer et al. | 335/227 |

FOREIGN PATENT DOCUMENTS

| | | | |
|---|---|---|---|
| 725702 | 3/1955 | United Kingdom | 251/129.15 |
| 437874 | 1/1975 | U.S.S.R. | 251/129.21 |

*Primary Examiner*—Arnold Rosenthal

*Attorney, Agent, or Firm*—Cushman, Darby & Cushman

[57] ABSTRACT

An electromagnetically-operated fuel injection valve has a magnetic circuit comprising a valve casing, a stator core on which an electromagnetic coil is wound, an armature core, and an air gap between the stator core and the armature core. At least one of the valve casing, the stator core and the armature core is so configuared that the magnetic flux passing therethrough is saturated substantially at the time the armature core is fully attracted to inject fuel. A magnetic restrictor at which the cross-sectional area for the magnetic flux is reduced than that at the other portion is provided at least at a portion of the valve casing, the stator core and the armature core so that the magnetic flux is saturated thereat substantially at the time the armature core is attracted fully.

9 Claims, 4 Drawing Figures

ELECTROMAGNETICALLY-OPERATED FUEL INJECTION VALVE

BACKGROUND OF THE INVENTION

The present invention relates to an electromagnetically-operated fuel injection valve for use in an electronically-controlled fuel injection system.

In an electronically-controlled fuel injection system for an internal combustion engine of an automotive vehicle, an electromagnetically-operated fuel injection valve has been used.

As disclosed in Kamai et al U.S. Pat. No. 4,331,317 assigned to the same assignee of the present application, for instance, the fuel injection valve generally has an electromagnetic coil wound on a stator core in a valve casing, an armature core integrally connected with a valve needle for opening and closing an injection port, and a spring disposed between the stator core and the armature core for biasing the valve needle to close the injection port. While the electromagnetic coil is energized, a magnetic circuit is formed through the stator core, the valve casing, the armature core and an air gap between the stator core and the armature core, and the armature core is attracted against the biasing force of the spring so that the valve needle integral with the armature core opens the injection port for metering fuel.

In the magnetic circuit, the minimum cross-sectional area for the magnetic flux is formed at a portion where the bottom of the stator core and the top of the armature core face with the air gap therebetween and the cross-sectional area for the magnetic flux in the other portions of the magnetic circuit is made larger than the minimum cross-sectional area. As a result, while the electromagnetic coil is kept energized, the electric current actually flowing through the electromagnetic coil and the resulting electromagnetic force increase gradually until the magnetic saturation occurs, even after the armature core and the valve needle are fully attracted to open the injection port fully after a valve opening response delay. Since the time period the electromagnetic coil is kept energized is varied in proportion to the required quantity of fuel, the electric current having been flowing through the electromagnetic coil and the electromagnetic force generated just before the electromagnetic coil is deenergized is dependent on the time period the electromagnetic coil has been energized. As a result, a valve closing response delay in which the valve needle is returned to the fully closed position from the fully open position in response to the deenergization of the electromagnetic coil is varied in dependence on the energization time period. Therefore, even if the valve opening response delay is substantially constant, linearity between the energization time period and the metered quantity of fuel cannot be assured.

SUMMARY OF THE INVENTION

It is a primary object of the invention to provide an electromagnetically-operated fuel injection valve capable of assuring substantial linearity between the energization time period and the metered quantity of fuel.

It is a further object of the invention to provide an electromagnetically-operated fuel injection valve the valve closing response delay of which is maintained substantially constant.

It is a still further object of the invention to provide an electromagnetically-operated fuel injection valve the magnetic circuit of which magnetically saturates substantially as soon as an armature core is fully attracted.

The electromagnetically operated fuel injection valve according to the present invention has a magnetic circuit comprising a valve casing, a stator core on which an electromagnetic coil is wound, an armature core integral with a valve needle, and an air gap between the stator core and the armature core. At least one of the valve casing, the stator core and the armature core is so configured that the magnetic flux passing therethrough is saturated substantially at the time the armature core is fully attracted.

BRIEF DESCRIPTION OF THE EMBODIMENT

DETAILED DESCRIPTION OF THE PREFERRED EMBODIMENTS

The present invention will be described in more detail hereinunder.

Figure 1:
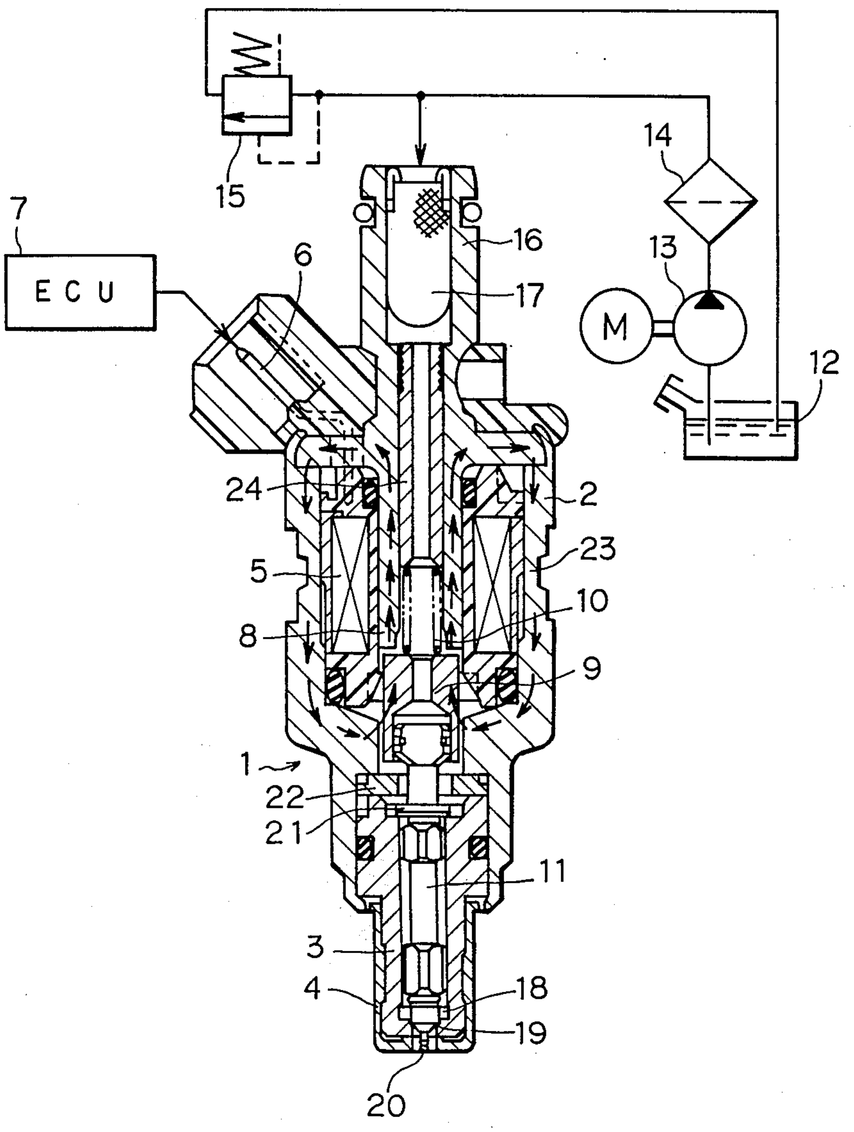
FIG. 1 is a cross-sectional view showing an electromagnetically-operated fuel injection valve according to a first embodiment of the present invention.

In FIG. 1 showing a first embodiment, numeral 1 designates a valve casing comprising a first body 2 and a second body 3. The bottom of the body 2 is bent to be firmly connected to the body 3. The body 2 is made of a conventional magnetic material such as ferrite having a low magnetic saturation characteristic. The body 2 is shaped generally cylindrically and has a magnetic restrictor 23 at which the cross-sectional area for the magnetic flux is reduced by the circumferentially formed groove. A cover 4 is presently fixed to the lower portion of the body 3.

An electromagnetic coil 5 connected to an electrical terminal 6 is provided in the first body 2 so that, when an electric pulse voltage is applied to the terminal 6 by an electronic control unit 7, the electromagnetic coil 5 is energized to generate magnetic flux.

A stator core 8 having a longitudinal inner space is fixedly provided in the body 2. The electromagnetic coil 5 is carried on the stator core 8 by way of a resin bobbin. The stator core 8 is made of the same magnetic material as the body 2. At the top end of the stator core 8, a connector portion 16 in which a fuel filter 17 is provided is formed to be connected to a fuel pipe 24.

An armature core 9 is movably provided in the body 2 to face the bottom end of the stator core 8 leaving an air gap therebetween. The armature core 9 is made of the same magnetic material as the body 2 and the stator core 8. A valve needle 11 is fitted, by caulking, to the bottom portion of the stator core 8 to be movable therewith. The top end portion of the valve needle 11 fitted within the through hole of the armature core 9 is formed with a pair of flat surfaces for allowing fuel flow therethrough. A coiled spring 10 is provided between the armature core 9 and the stator core 8 to downwardly bias the armature core 9 and the valve needle 11.

The top end of the coiled spring 10 is received by the bottom end of the fuel pipe 24 fitted in the stator core 8. The valve needle 11 which is axially movable within longitudinal inner spaces of the bodies 2 and 3 is provided with a conical head at the bottom end portion thereof. On the other hand, a valve seat 19 which receives the conical head of the valve needle 11 and a fuel injection port 20 which is in communication with a fuel chamber 18 are provided at the bottom of the body 3. The valve needle 11 has a stopper 21 and a stopper 22 is inserted between the bodies 2 and 3, thus limiting the upward movement of the valve needle 11.

The connector portion 16 is connected to a fuel tank 12 through a fuel filter 14 and a fuel pump 13 in one way and through a pressure regulator 15 in the other way.

While no electric pulse voltage is applied to the electromagnetic coil 5 by the control unit 7, the armature core 9 biased downward by the coiled spring 10 keeps the conical head of the valve needle 11 to seat on the valve seat 19 of the body 3 so that no fuel to be injected from the injection port 20 is metered. While the electric pulse voltage is applied to the electromagnetic coil 5 by the control unit 7, on the other hand, the electromagnetic coil 5 is energized to generate the magnetic flux which circularly passes a magnetic circuit comprising the body 2, the stator core 8, the armature core 9 and the air gap between the stator core 8 and the armature core 9 as shown by the arrows in the figure. As a result, the magnetic force is generated between the stator core 8 and the armature core 9 and the armature core 9 is attracted upward against the biasing force of the coiled spring 10. As the armature core 9 is attracted toward the stator core 10, the conical head of the valve needle 11 leaves the valve seat 19 so that fuel flowing through the fuel pipe 24, the armature core 9 and through the outer space of the valve needle 11 and being accumulated in the fuel chamber 18 is injected through the injection port 20.

When the electric pulse voltage applied to the electromagnetic coil 5 is stopped, the electromagnetic force between the stator core 8 and the armature core 9 disappears and the conical head of the valve needle 11 is pushed down by the coiled spring 10 to seat on the valve seat 19 so that fuel injection is stopped.

It should be noted, in the above-described first embodiment, that the magnetic restrictor 23 or the narrowed cross-sectional area is formed so as to limit the magnetic flux passing therethrough to the magnetic flux passing between the stator core 8 and the armature core 9 at the time the armature core 9 is fully attracted toward the stator core 8. In other words, the magnetic restrictor 23 effectuates magnetic saturation in the magnetic circuit as soon as the valve needle 11 is fully lifted. The magnetic restrictor 23 must be determined in relation to the magnetic material. When the magnetic material used has a high magnetic saturation characteristic, the cross-sectional area at the magnetic restrictor 23 must be decreased. When the magnetic material used has a low magnetic saturation characteristic, the cross-sectional area at the magnetic restrictor 23 must be increased.

The operational mode of the above-described embodiment will be described further with reference to FIG. 2 in which solid lines show characteristics of the first embodiment and dotted lines show characteristics of the conventional fuel injection valve having no magnetic restrictor.

Figure 2:
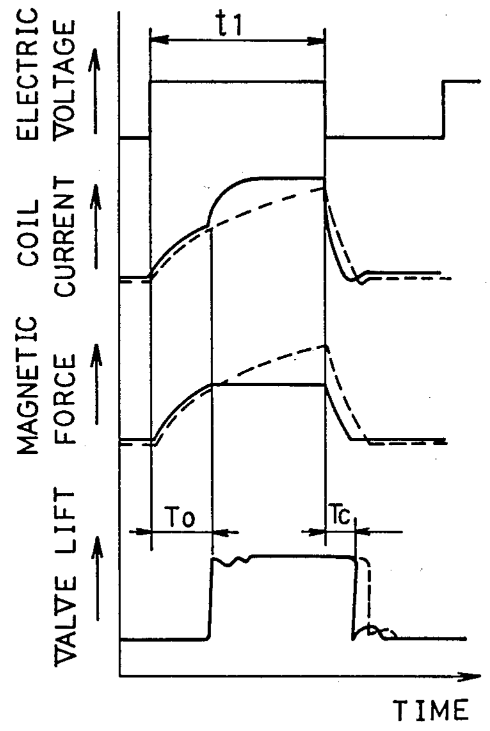
FIG. 2 is a time chart showing operational mode of the fuel injection valve according to the first embodiment shown in FIG. 1.

As shown in FIG. 2, as soon as the electric pulse voltage having a time period t1 is applied to the electromagnetic coil 5, the electric current passing through the coil 5 gradually increases because of the inductance of the coil 5 and hence the magnetic force generated also gradually increases. After a valve opening response delay To, the magnetic force attains a certain level at which the valve needle 11 is lifted to the uppermost position to fully open the injection port 20 so that fuel metering is initiated. When the valve needle 11 is lifted to the uppermost position, the air gap between the stator core 8 and the armature core 9 is reduced to the minimum and the magnetic resistance in the magnetic circuit is reduced to the minimum. With this minimum magnetic resistance, the coil current in the magnetic coil 5 increases thereafter. However, the magnetic flux in the magnetic circuit is saturated by the magnetic restrictor 23 so that the magnetic force is kept substantially unchanged relative to the increase in the coil current as opposed to the conventional one in which the magnetic force is proportional to the coil current. When the electric pulse voltage applied to the magnetic coil 5 disappears, the coil current and the magnetic force decreases gradually. When the magnetic force is reduced to zero, the valve needle is returned to the lowermost position to close the injection port 20 to terminate metering fuel. Thus the valve needle 11 is kept open for a valve closing response delay Tc even after the electric pulse voltage disappears irrespective of the time period t1 of the electric pulse voltage, the valve closing response delay Tc is unchanged irrespective of the time period t1 of the electric pulse voltage. As a result, the quantity of fuel injected through the injection port 20 is made proportional to the time period t1 of the electric pulse voltage as opposed to the conventional one in which the quantity of fuel injected is varied in dependence on the varied valve closing response delay Tc.

Figure 3:
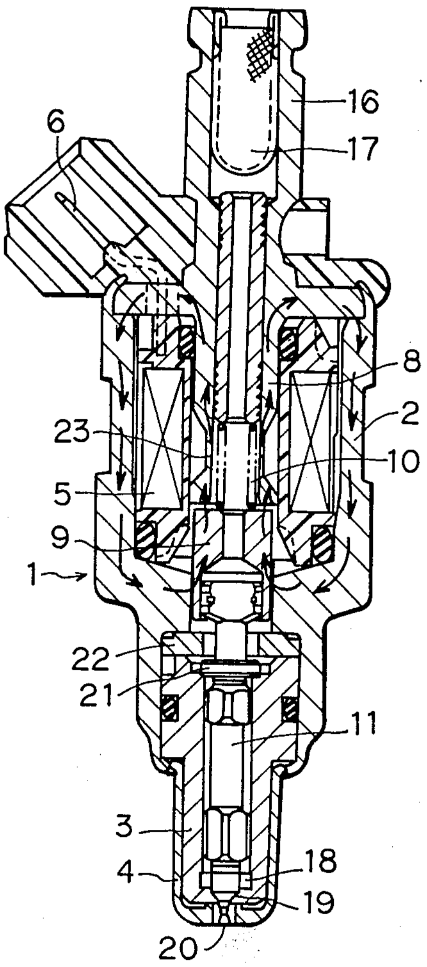
FIG. 3 is a cross-sectional view showing an electromagnetically-operated fuel injection valve according to a second embodiment of the present invention.
Figure 4:
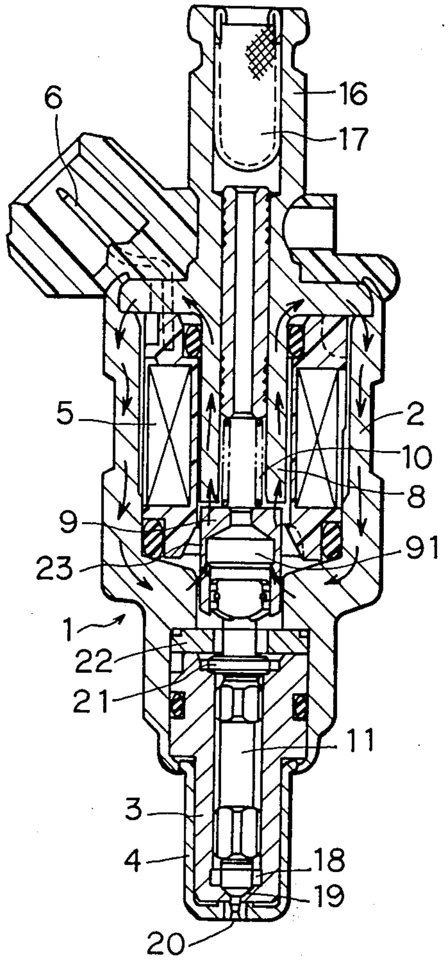
FIG. 4 is a cross-sectional view showing an electromagnetically-operated fuel injection valve according to a third embodiment of the present invention.

FIGS. 3 and 4 show a second and third embodiments, respectively, in which same reference numerals are used to designate the same or equivalent portions as in the first embodiment shown in FIG. 1.

According to the second embodiment shown in FIG. 3, the magnetic restrictor 23 the cross-sectional area of which is smaller than the facing area between the bottom end of the stator core 8 and the top end of the armature core 9 is provided on the stator core 8 by a circumferentially formed outer groove. According to the second embodiment, the magnetic restrictor 23 is not provided on the body 2 but provided on the stator core 8. Therefore, the mechanical strength of the body 2 which is fixedly attached to an internal combustion engine (not shown) is assured.

In the third embodiment shown in FIG. 4, the magnetic restrictor 23 is provided in the armature core 9 by forming a widened inner hole 91. According to the third embodiment, the weight of the armature core 9 is decreased and therefore the valve opening response delay To and the valve closing response delay Tc are made shorter.

The present invention having been described hereinabove is not limited to the specific embodiments but may be modified in many ways without departing from the spirit of the invention.

What I claim is:

1. An electromagnetically-operated fuel injection valve comprising:

an electromagnetic coil for generating magnetic flux when energized by the electric current supplied thereto;

a tubular stator core made of a magnetic material for said magnetic flux and carrying said electromagnetic coil thereon, said stator core having a central passage for flowing fuel therethrough;

a generally cylindrical valve casing made of a magnetic material for said magnetic flux and coaxially encasing said electromagnetic coil and said stator core therein;

an armature core made of a magnetic material for said magnetic flux and facing said stator core with an air gap therebetween, said armature core being movably disposed in said valve casing to be attracted toward said stator core when said electromagnetic coil is energized;

a fuel metering member integrally connected to said armature core for opening a fuel injection port communicated with said central passage of said stator core when said armature core is attracted thereby to meter fuel to be injected;

a spring positioned between said stator core and said armature core and biasing said armature core and said fuel metering member to close said fuel injection port; and a thinned wall section provided in a magnetic flux path formed by said stator core, said valve housing and said armature core; the thickness of said thinned wall section being so determined that the magnetic flux passing therethrough is saturated thereat substantially only at and after the time said armature core is fully attracted to move said metering member to open said injection port, whereby magnetic force generated just before deenergization of said coil is made constant irrespective of the electric current having been supplied to said coil.

2. A fuel injection valve according to claim 1, wherein said valve housing is provided with a magnetic restrictor at a portion thereof by which the cross-sectional area for said magnetic flux is reduced than that at the other portion thereof so that the magnetic flux is saturated thereat.

3. A fuel injection valve according to claim 1, wherein said stator core is provided with a magnetic restrictor at a portion thereof by which the cross-sectional area for said magnetic flux is reduced than that at the other portion thereof so that the magnetic flux is saturated thereat.

4. A fuel injection valve according to claim 1, wherein said armature core is provided with a magnetic restrictor at a portion thereof by which the cross-sectional area for said magnetic flux is reduced than that at the other portion thereof so that the magnetic flux is saturated thereat.

5. An electromagnetically-operated valve comprising:

an electromagnetic coil for generating magnetic flux when energized by the electric current supplied thereto;

a stator core made of a magnetic material and carrying said electromagnetic coil thereon;

a generally cylindrical valve casing made of a magnetic material and coaxially encasing said electromagnetic coil and said stator core therein, said valve casing forming therein a fluid passage;

an armature core made of a magnetic material and facing said stator core with an air gap therebetween, said armature core being movably disposed in said fluid passage of said valve casing to be attracted toward said stator core when said electromagnetic coil is energized;

a metering member integrally connected to said armature core for opening said fluid passage when said armature core is attracted to said stator core;

a spring biasing said armature core and said metering member to close said fluid passage; and a magnetic restrictor provided in a magnetic flux path formed by said stator core, said valve casing and said armature core, said magnetic restrictor comprising a thinned wall section the thickness of which is so determined that the magnetic flux generated by said electromagnetic coil is saturated thereat substantially only at and after the time said armature core is fully attracted to move said metering member to open said fluid passage whereby magnetic force generated just before deenergization of said coil is made constant irrespective of the electric current having been supplied to said coil.

6. A valve as set forth in claim 5, wherein the total cross-sectional area of said thinned wall section is smaller than a facing area where said armature core and stator core face each other.

7. A valve as set forth in claim 5, wherein said armature core has a cylindrical wall fixedly receiving an end portion of said metering member therein, and wherein said magnetic restrictor is circumferentially formed on said cylindrical wall of said armature core.

8. A valve as set forth in claim 5, wherein said armature core has a cylindrical wall fixedly receiving an end portion of said metering member therein, and wherein said magnetic restrictor is formed by a groove circumferentially provided on an inner face of said cylindrical wall of said armature core.

9. A valve as set forth in claim 5, wherein each of said stator core, said valve casing and said armature core has respective cylindrical walls, and wherein said magnetic restrictor is formed by a groove circumferentially provided on one of said cylindrical walls.

* * * * *